March 31, 1959 H. G. McCARTY ET AL 2,880,004
FORAGE WAGON DISCHARGE CONTROL BAFFLE
Filed Nov. 14, 1956
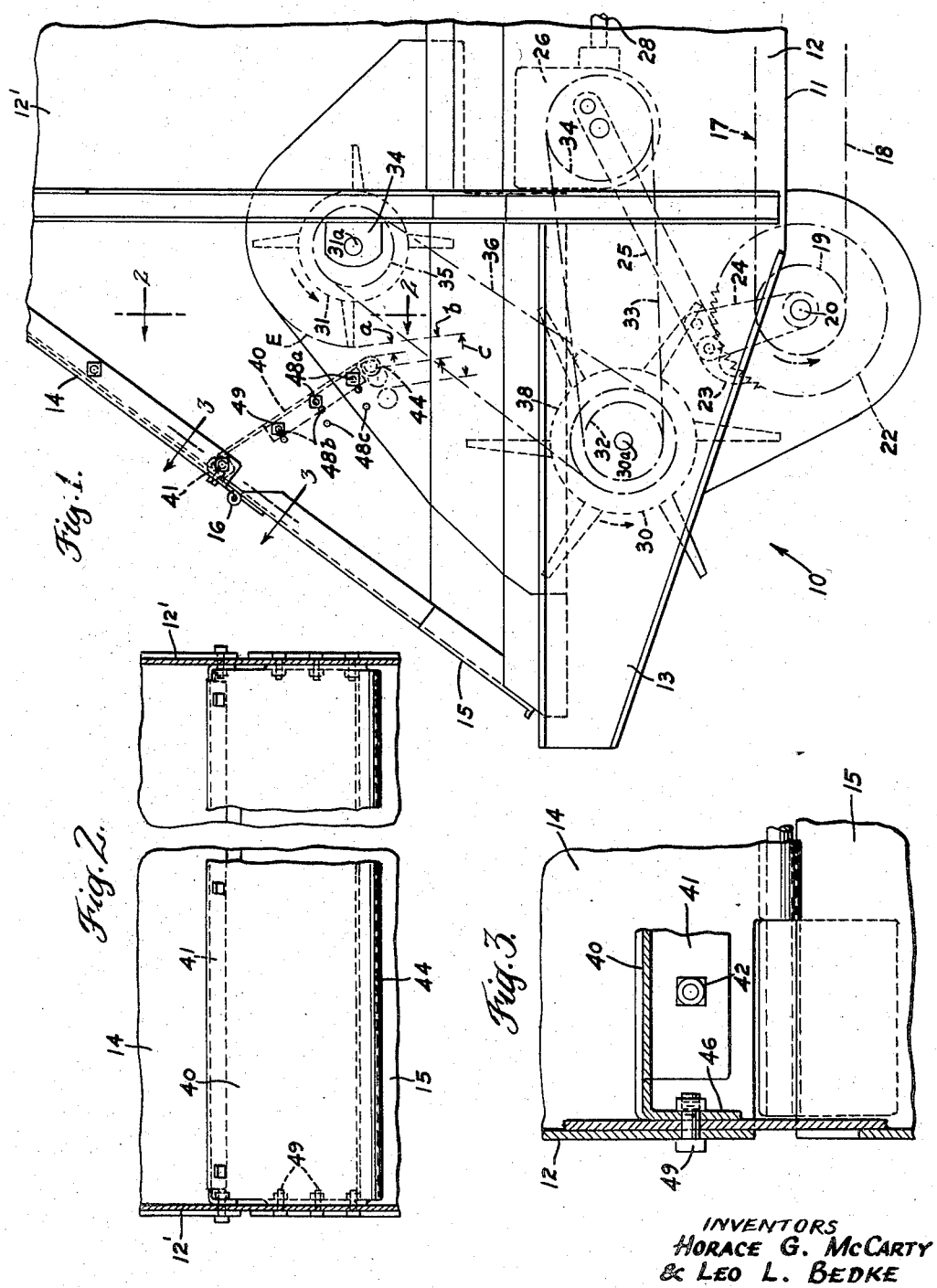
INVENTORS
HORACE G. McCARTY
& LEO L. BEDKE
BY Joseph Allen Brown
ATTORNEY United States Patent Office 2,880,004
Patented Mar. 31, 1959

2,880,004

FORAGE WAGON DISCHARGE CONTROL BAFFLE

Horace G. McCarty and Leo L. Bedke, New Holland, Pa., assignors to Sperry Rand Corporation, New Holland, Pa., a corporation of Delaware Application November 14, 1956, Serial No. 622,138

3 Claims. (Cl. 275—3)

The present invention relates generally to farm wagons, and more particularly, to wagons adapted to haul and automatically unload bulk, fibrous material.

A conventional manure spreader wagon of the end discharge type comprises a body adapted to hold a load of manure. The wagon has a bed or base over which transverse slats are adapted to travel to move the manure more or less en masse toward the rear of the wagon. Mounted transversely across the back of the wagon is an upper beater and a lower beater which operate to break up the manure and propel it rearwardly as the wagon is towed over a field. By mounting extension panels on walls of such a manure spreader wagon, the capacity of the wagon may be increased and it may be advantageously used as a forage wagon. When a manure spreader wagon is so modified for use as a forage wagon, several problems result. It is common to tow the wagon behind a forage harvester whereby the wagon receives the forage as it is discharged from a spout on the harvester. Generally, the forage is directed rearwardly from the spout and toward the rear of the wagon. Such rearwardly directed forage has, heretofore, covered up the beaters and filled the space between the beaters and the rear of the wagon. When the time comes for unloading the wagon, the forage tends to resist the institution of the rotation of the beaters and a substantial torque, over and above that ordinarily necessary, is required to overcome this resistance.

It is common, also, to use a cross-conveyor on the rear of the wagon to receive discharged forage and convey it laterally into a "bunk" or the like as the wagon is towed along. Sometimes a "bridge" of forage becomes lodged between the upper beater and the rear wall of the wagon. As the wagon moves along while unloading, the rocking of the wagon will usually dislodge this "bridge" in time and drop it, all at once, onto the cross-conveyor. Heretofore, this has caused excessive shear bolt failure in the cross-conveyor drive which obviously is undesirable.

Bridged material is also a problem where the forage is deposited on a conveyor which delivers the material to a blower which blows the forage into a silo or the like. When a bridge of material breaks loose, an excessive charge of material may be delivered to the blower over and above the blower's capacity to receive it, thereby jamming the mechanism.

Moreover, since the height or depth of the forage in the wagon is greater than the height of the upper beater when panels are used and when the wagon is filled, considerable forage moves over the upper beater during unloading without being acted upon, that is, broken up, by the beater.

One object of this invention is to provide means in a forage wagon of the character described for reducing the build-up of forage between the beaters in the wagon and the rear wall thereof when the wagon is loaded whereby the rotation of the beaters may be more easily instituted when the wagon is unloaded.

Another object of this invention is to provide simple means in a forage wagon of the character described for preventing the upper portion of a load from being discharged during unloading without being acted upon by the upper beater.

Still another object of this invention is to provide means of the character described which prevents excessive charges of material from being discharged from the rear end of the wagon during an unloading operation.

A further object of this invention is to provide means which insures better mixing of the load adjacent the top of the wagon during unloading.

A still further object of this invention is to provide discharge control means in a forage wagon of the character described having a cross-conveyor for receiving the material as it is discharged, said control means protecting the cross-conveyor from damage due to material being discharged in chunks or in excessive volume.

Other objects of the invention will be apparent hereinafter from the specification and from the recital in the appended claims.

In the drawing:

Fig. 1 is a fragmentary, semi-diagrammatic side elevation of the rear or discharge end of a manure spreader wagon modified for use as a forage wagon and having discharge control means constructed according to this invention;

Fig. 2 is a fragmentary section taken on the line 2—2 of Fig. 1 looking in the direction of the arrows; and, Fig. 3 is an enlarged fragmentary section taken on the line 3—3 of Fig. 1 looking in the direction of the arrows.

Referring now to the drawing by numerals of reference, and particularly to Fig. 1, 10 denotes generally the discharge end of an automatic unloading wagon adapted to haul a large quantity of material such as corn ensilage, chopped hay, or the like. The wagon has a bed or base 11, side walls 12, side wall extensions 12', a front wall and front wall extension, not shown, a downwardly and outwardly inclined rear wall 14 and a tail gate 15. Tail gate 15 is hinged at 16 to the rear wall 14.

Movable across the top of bed 11 to feed the material in the wagon toward the rear portion thereof is a conventional endless, transverse, slat-type conveyor 17, a portion of which is illustrated diagrammatically in Fig. 1. Such conveyor is similar to that shown and described in detail in U.S. Patent No. 2,699,337, issued January 11, 1955. The slats of the conveyor are carried on endless chains 18 extending longitudinally along opposite sides of the wagon adjacent the bottom thereof, the chains being trained over sprockets mounted at the front and rear of the wagon. One rear sprocket 19 is shown in Fig. 1.

Sprocket 19 is mounted on a suitably journaled shaft 20 rotatable by means of a ratchet wheel 22. Ratchet wheel 22 is driven by a pawl 23 mounted on a support arm 24 and actuated by a crank rod 25 driven from a gear box 26. Gear box 26 has a power input shaft 28 connectable to a source of power, not shown, such as the power plant of the tractor used for towing the wagon.

Rotatably mounted within the discharge end of the wagon are spaced, transversely extending, parallel beaters, namely, lower beater 30 and upper beater 31. Lower beater 30 is mounted on the shaft 30a having a sprocket 32 driven by an endless chain 33. Endless chain 33 is trained around sprocket 32 and around a sprocket 34 carried on and driven from gearbox 26. Upper beater 31 is mounted on a shaft 31a supported in bearings 34. Shaft 31a has a sprocket 35 driven by an endless chain 36. Chain 36 extends around sprocket 35 and around a second sprocket 38 carried on lower beater shaft 30a.

The lower beater 30 is of considerably larger diameter than upper beater 31; and, further, the lower beater is mounted rearwardly of upper beater 31. Such a disposition of the beaters, and the structure of the wagon just described, is conventional.

In operation, the endless conveyor 17 moves the material in the wagon towards the rear thereof. The material moves en masse and into the rapidly rotating beaters 30 and 31. The beaters engage the material and break it up, ejecting it rearwardly toward wall 14 and tail gate 15. The material, after moving past the beaters, drops by gravity through a discharge opening defined by opposed side walls 12, lower beater 30 and the lower end of tail gate 15, and into a receptacle, such as a cross-conveyor mechanism, not shown.

As previously stated, when the wagon is loaded with material directly from a forage harvester, such material often becomes packed between the beaters and the wagon rear wall. This creates a torque problem. Further, such packed material may cause the formation of a material "bridge" after the unloading operation is started. When the bridged material breaks loose, damage may result, as recited earlier. Also, it is important that all the material leaving the wagon be subjected to action of the beaters so that lumps or chunks of material will be broken up and shredded before discharge. Applicants' invention resides in a structure of utmost simplicity which greatly reduces the problem of packed and/or bridged material, and insures that all material is subjected to the beaters and discharged at a uniform rate. Such structure will now be described.

Extending transversely across the rear of the forage wagon is a sheet metal baffle plate 40 having a bent, longitudinal edge 41 connected by bolts 42 to end wall 14. Plate 40 extends downwardly and inwardly from end wall 14. It has a rolled edge 44 which extends parallel to the axis of rotation of upper beater 31. This edge is disposed close to arc E which indicates the path generated on rotation of beater 31.

Baffle plate 40 has some resiliency; and, it is mounted for pivotal adjustment about edge 41 to vary the spacing between edge 44 and circle E. In the embodiment of the invention illustrated, plate 40 may be set, selectively, in one of three spaced positions from beater 31 denoted by *a*, *b*, and *c*, Fig. 1. Each lateral end of the plate is bent to form a flange 46 connectable to a side wall 12 of the wagon. Each flange has a set of three holes adapted to be aligned, selectively, with one of three sets of holes 48*a*, 48*b*, and 48*c* in each side wall 12. After a desired adjustment and alignment has been obtained between the holes in the flanges and the holes in the side walls, the baffle may be affixed in place by bolt-nut means 49.

When forage in wagon 10 is unloaded, the portion of the forage adjacent the top of the wagon will pass over upper beater 31 and against wall 14. It will then move downwardly to baffle plate 40 under the force of gravity and the on-coming material, and also due to the downward, rearward slant of wall 14. The baffle plate will then direct this forage downwardly and inwardly, preventing discharge of the upper forage mass until it has been acted upon by upper beater 31. If a bridge of material develops adjacent the top, rear of the wagon, it can do no damage when it is shaken loose, merely falling on baffle plate 40 and then moving into beater 31.

The adjustability of the baffle adapts it for optimum positioning depending on the type of material being handled. When fine forage materials are being carried and then discharged, baffle plate 40 is disposed as shown in Fig. 1. For coarser materials, the baffle plate is adjusted to one of its two other positions.

Baffle plate 40, while of simple construction, fulfills an important need and at small cost. The possibility of unbroken, and/or excessive masses of material being discharged from the wagon when the wagon is unloaded is obviated.

While this invention has been described in connection with a particular embodiment thereof, it will be understood that it is capable of further modification and other uses. For example, means might be provided for adjusting the baffle 40 over a greater range than three adjusted positions. This application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention, what we claim is:

1. In a wagon having a pair of relatively spaced side walls, a downwardly and outwardly inclined rear wall, a bottom wall defining with said rear wall an outlet opening, a rotatable beater extending between said side walls below the top edges thereof and forwardly of said rear wall to thereby provide an unobstructed area over the beater and a space between said rear wall and the beater, and means for feeding material en masse toward said rear wall whereby a portion of said material may pass over said beater and then through said space, the combination of control means disposed in said space for the material passing therethrough and operable to direct said material forwardly toward said rotatable beater whereby the beater may operate upon it before it is discharged through said outlet opening, said control means comprising a baffle extending and traversing the space between said side walls and downwardly and inwardly from said rear wall, and means supporting said baffle in fixed relation to said walls.

2. In a wagon having a pair of relatively spaced side walls, a downwardly and outwardly inclined rear wall, a bottom wall defining with said rear wall an outlet opening, a rotatable beater extending between said side walls below the top edges thereof and forwardly of said rear wall to thereby provide an unobstructed area over the beater and a space between said rear wall and the beater, and means for feeding material en masse toward said rear wall whereby a portion of said material may pass over said beater and then through said space, the combination of control means disposed in said space for the material passing therethrough and operable to direct said material toward said rotatable beater whereby the beater may operate upon it before it is discharged through said outlet opening, said control means comprising a fixed baffle extending and traversing the space between said side walls and projecting downwardly and inwardly from said rear wall, said baffle having a lower edge spaced from said beater, and means for selectively regulating the fixed position of said baffle whereby the space between said beater and said lower edge may be established.

3. In a wagon having a pair of relatively spaced side walls, a downwardly and outwardly inclined rear wall, a bottom wall defining with said rear wall an outlet opening, a pair of rotatable beaters mounted one above the other between said side walls, the upper beater of said pair of beaters being disposed forwardly of said lower beater and said rear wall and below the top edges of said side walls, thereby providing an unobstructed area over said upper beater and a space between said rear wall and the upper beater, and means for feeding material en masse toward said rear wall whereby a portion of said material may pass over said upper beater and then through said space, the combination of control means disposed in said space for the material passing therethrough and operable to direct said material toward said upper beater whereby it may be operated upon before it is discharged through said outlet opening, said control means comprising a generally rectangular, resilient baffle fastened along one edge to said rear wall and having an edge parallel to said one edge spaced from said upper beater, said space between said baffle and upper beater being variable on pivotal adjustment of the baffle about said one edge, a flange on each lateral end of said baffle having one hole, at least, each of said side walls having a plurality of holes, the hole in each flange being adapted to be aligned with a hole in the adjacent side wall of the wagon, and means projectable through the holes in said flanges and said side walls for fastening said baffle to said side walls and holding it in fixed adjusted position.

References Cited in the file of this patent

UNITED STATES PATENTS

| | | |
|---|---|---|
| 443,523 | Hughes | Dec. 30, 1890 |
| 1,259,089 | Felcyn | Mar. 12, 1918 |
| 1,396,106 | Garst | Nov. 8, 1921 |
| 2,626,809 | Fergason | Jan. 27, 1953 |
| 2,653,028 | Templeton | Sept. 22, 1953 |
| 2,711,902 | Martin | June 28, 1955 |